United States Patent
Muramoto et al.

(10) Patent No.: US 7,924,714 B2
(45) Date of Patent: Apr. 12, 2011

(54) COMMUNICATION METHOD AND RECEIVING TERMINAL

(75) Inventors: Eiichi Muramoto, Osaka (JP); Takahiro Yoneda, Osaka (JP); Toyoki Kawahara, Osaka (JP)

(73) Assignee: Panasonic Corporation, Osaka (JP)

( * ) Notice: Subject to any disclaimer, the term of this patent is extended or adjusted under 35 U.S.C. 154(b) by 926 days.

(21) Appl. No.: 11/813,476

(22) PCT Filed: Jan. 6, 2006

(86) PCT No.: PCT/JP2006/300088
§ 371 (c)(1),
(2), (4) Date: Jul. 6, 2007

(87) PCT Pub. No.: WO2006/075559
PCT Pub. Date: Jul. 20, 2006

(65) Prior Publication Data
US 2009/0285211 A1   Nov. 19, 2009

(30) Foreign Application Priority Data
Jan. 11, 2005  (JP) ................................. 2005-003967

(51) Int. Cl.
*G01R 31/08* (2006.01)
(52) U.S. Cl. .......................... 370/230; 370/235; 709/231
(58) Field of Classification Search .................. 370/229, 370/230, 231, 232, 235, 252, 389; 709/231, 709/233
See application file for complete search history.

(56) References Cited

U.S. PATENT DOCUMENTS

| | | | | |
|---|---|---|---|---|
| 6,563,822 B1 * | 5/2003 | Aoki | ........................... | 370/390 |
| 2004/0078490 A1 * | 4/2004 | Anderson et al. | ............. | 709/245 |
| 2005/0005020 A1 * | 1/2005 | Rey et al. | ...................... | 709/231 |

FOREIGN PATENT DOCUMENTS

| | | |
|---|---|---|
| EP | 1 601 126 | 11/2005 |
| JP | 2004-129205 | 4/2004 |
| JP | 2004129205 A * | 4/2004 |

OTHER PUBLICATIONS

Handley, M. et al.; TCP Friendly Rate Control (TFRC): Protocol Specification; IN: Request for Comments: 3448; Jan. 2003, The Internet Society, U.S.A.

* cited by examiner

*Primary Examiner* — Jung Park
(74) *Attorney, Agent, or Firm* — Pearne & Gordon LLP

(57) ABSTRACT

It is an object of the present invention to receive/play a streaming immediately after a switching not to disconnect it when a terminal for receiving the streaming is switched from a first receiving terminal to a second receiving terminal
A communication method of switching a receiving terminal of a streaming to which a rate control using TFRC is applied from a first receiving terminal to a second receiving terminal, includes a deciding step of deciding whether or not a route on a network between a transmitting terminal of the streaming and the first receiving terminal is identical to a route on the network between the transmitting terminal and the second receiving terminal, and a transferring step of transferring history information of a packet loss that the first receiving terminal is managing to the second receiving terminal when it is decided that both routes are identical.

8 Claims, 10 Drawing Sheets

FIG. 10

INVITE sips:bob@biloxi.example.com SIP/2.0
Via: SIP/2.0/TLS client.atlanta.example.com:5061;branch=z9hG4bK74bf9
Max-Forwards: 70
From: Alice <sips:alice@atlanta.example.com>;tag=1234567
To: Bob <sips:bob@biloxi.example.com>
Call-ID: 12345601@atlanta.example.com
CSeq: 1 INVITE Contact: <sips:alice@client.atlanta.example.com>
Allow: INVITE, ACK, CANCEL, OPTIONS, BYE, REFER, NOTIFY
Supported: replaces Content-Type: application/sdp
Content-Length: … v=0
o=alice 2890844526 2890844526 IN IP4 client.atlanta.example.com
s=Session SDP
c=IN IP4 client.atlanta.example.com
m=audio 49170 RTP/AVP 0
a=tfrchistory:8,1024,2000,300,400,500,600,700,800

COMMUNICATION METHOD AND RECEIVING TERMINAL

TECHNICAL FIELD

The present invention relates to a communication method capable of changing a receiving terminal that receives a streaming in which a rate control using TFRC (TCP Friendly Rate Control) is executed from a first receiving terminal to a second receiving terminal, and a receiving terminal.

BACKGROUND ART

Hereinafter, explanation will be made by supplying a definition of the "Internet" for the network that connects mutually neighboring routers of respective terminals. More concretely, when data are transmitted from the terminal in a house to the terminal in another house, the sent data are transmitted from the in-house router via the access line such as ADSL, optical line, or the like, the lines of a plurality of ISPs (Internet Service Providers), and the like. In addition, the sent data are delivered to the terminal in another house via the access line and the in-house router connected to another house. The network laid from this in-house router to another in-house router is called the Internet.

It is difficult to ensure a fixed bandwidth between any terminals connected to the Internet. In the prior art, as the system of reserving the band between the routers in the Internet, INTSERV (Integrated Services) used to ensure the bandwidth by using RSVP (Resource ReSerVation Protocol) every communication between respective terminals is known. However, this INTSERV has not been put to practical use because the same system must be applied to all routers that plural ISPs manage on the Internet. Therefore, the communications handled by all terminals share the bandwidth among them on the Internet, i.e., the communication is carried out on a so-called best effort basis.

As the communication system used to share fairly the bandwidth among the communications handled by respective terminals on the Internet that performs a best effort type service, TCP is widely used. This TCP is used in the electronic mail, the P2P (peer to peer) file exchange communication such as WWW (World Wide Web), Winny, or WinMX, and the like, and takes up most of the Internet traffic. Therefore, in the communication on the Internet that executes the best effort type service, it is recommended that the congestion control should be accomplished by controlling the transmission rate to share fairly the bandwidth with this TCP (Reference Literature: "Congestion Control Principles", RFC 2914).

Meanwhile, TCP exhibits the characteristic called AIMD (Additive Increase Multiple Decrease) in the transmission rate control. Since the transmission rate is changed drastically due to this characteristic, this TCP is unsuited to the streaming that transmits the continuous information such as sound, moving picture, and the like via the network.

In order to overcome this problem, TFRC that can share fairly the bandwidth with TCP while achieving the smooth transmission rate control has been developed.

This TFRC is the method that estimates a transmission rate (X), at which TFRC can share fairly the bandwidth with TCP, based on a loss event rate (p) and a round trip time (R) described later to control the transmission rate. Concretely, the transmission rate (X) is estimated by Eq. (1) given as follows.

[Formula 1]

$$Xcal = \frac{8s}{R(\sqrt{2p/3} + t\_RTO \times \sqrt{3p/8} \times (1 + 32p^2))} \quad (1)$$

In the transmission rate control using TFRC, the estimation of the transmission rate using this Eq. (1) is executed every time when a loss occurs (see FIG. 1).

In order to achieve smooth transmission rate control in the transmission rate control of this TFRC, the loss event rate (p) is calculated by taking account the loss information collected several times (eight times in FIG. 1) in the past.

In TFRC, both a quick congestion avoidance, which should be taken when the Internet is brought into an excessive congestion state, and the smooth rate control can be attained by executing such control. That is, a number of loss events occurs in a short time when the congestion state occurs on the Internet. Thus, the loss event rate observed by the receiving terminal has instantly a large value. Because this value is reported to the sender every loss, the transmission rate can be calculated immediately by Eq. (1) and is applied, an amount of flow of calls can be suppressed. As a result, this operation acts as congestion avoidance on the Internet. Conversely, when an excessive congestion state does not occur on the Internet and the loss does not occur so much, a frequency of occurrence of the loss is lowered and also the loss event rate observed on the receiver side is reduced. As described above, since the loss event rate is calculated by taking account a loss history, the loss event rate is decreased smoothly in time and accordingly the transmission rate is increased smoothly. In summary, a quick congestion avoiding operation is taken when the congestion occurs on the Internet, while the transmission rate is varied (increased) smoothly when the communications recover from the congestion state.

Also, in TFRC, an operation of increasing the transmission rate gradually from a transmission rate=1 packet/round trip time (called a slow start) is taken in starting the transmission, like TCP. However, because the transmission rate is varied smoothly in TFRC rather than TCP, it takes much time until the transmission rate reaches a rate that is required to send the streaming. Also, in the streaming that regenerates the data while receiving the data continuously, the data cannot be played on the receiver side unless the transmission rate that is in excess of a playing rate can be maintained. Therefore, the receiving terminal needs much time to start actually the regeneration of video, etc. after such terminal started the reception of the streaming.

For this reason, when the user switches the receiving terminal from the particular terminal to a new terminal, a lot of queuing time is required of the user.

Meanwhile, such a system has been proposed that, when the streaming is to be transmitted to a new receiving terminal, the other terminal informs the concerned receiving terminal at what extent of the transmission rate the streaming can be transmitted (see Patent Literature 1, for example).

In this system, when the new terminal is connected to the Internet and then is logged in a particular server (e.g., server for exchanging instant messages) on the Internet, a bandwidth measuring server on the Internet measures an effective bandwidth between the new terminal and the bandwidth measuring server. Then, the bandwidth measuring server informs another terminal of the information about the measured effective bandwidth via the particular server. Then, the new terminal holds the communication with another terminal by using this information.

With this system, the transmission rate that is adequate to the streaming executed between the new terminal and another terminal can be decided roughly by using a value that is close to the effective bandwidth of the new terminal. Concretely, when the effective bandwidth between the new terminal and the bandwidth measuring server is 1.5 Mbps, the user gives up the idea of transmitting the high-definition moving picture whose maximum transmission rate is 6 Mbps, or the like. Then, instead of this moving picture, the user can transmit the low-definition moving picture whose maximum transmission rate is almost 1 Mbps.

Patent Literature 1: JP-A-2004-129205

DISCLOSURE OF THE INVENTION

Problems that the Invention is to Solve

In the above system in the prior art, it may be considered that, since the bandwidth between the terminal and the measuring server is measured, the measured value is effective in grasping roughly an upper limit of an effective rate of the access line that is connected to the Internet. However, since this value does not correspond to the value that is derived by measuring the bandwidth between the transmitting terminal and the receiving terminal between which the streaming is transmitted, such value cannot be applied as the transmission rate (the initial rate of TFRC) at which the streaming is transmitted actually. More concretely, when the streaming that is being received by the first receiving terminal (e.g., the display device provided in the kitchen) connected to one in-house router is switched to the second receiving terminal (e.g., the display device provided in the living room) connected to the same in-house router, the transmission rate that the first receiving terminal is using up to now cannot be applied immediately to the second receiving terminal. That is, since the bandwidth between the second receiving terminal and the transmitting terminal has not already been measured, the transmitting terminal must take the slow start inevitably in the streaming using TFRC and thus the transmission rate must be increased after the transmission is started from a state in which the transmission rate is low. As a result, a queuing time required until the second receiving terminal can play the streaming such as moving picture, and the like after the switching is protracted.

The present invention has been made in view of the above problems, and it is an object of the present invention to provide a communication method capable of receiving/playing a streaming immediately after a switching not to disconnect it when a terminal that receives the streaming to which a transmission rate control using TFRC algorithm is applied is switched from a first receiving terminal to a second receiving terminal, and a receiving terminal.

Means for Solving the Problems

A communication method of the present invention of switching a receiving terminal of a streaming to which a rate control using TFRC is applied from a first receiving terminal to a second receiving terminal, includes a deciding step of deciding whether or not a route on a network between a transmitting terminal of the streaming and the first receiving terminal is identical to a route on the network between the transmitting terminal and the second receiving terminal; and a transferring step of transferring history information of a packet loss that the first receiving terminal is managing to the second receiving terminal when it is decided that both routes are identical.

According to this configuration, when it is decided that both routes are identical to each other, the packet loss history information that the first receiving terminal is managing is transferred to the second receiving terminal. Thus, the second receiving terminal can receive immediately the streaming at the same transmission rate as the transmission rate that the first receiving terminal is using, by using the transferred history information without the execution of the slow start. Therefore, the streaming can be received and played without a disconnection immediately after the receiving terminal is switched.

Also, according to this configuration, it is decided that the route on the network between the transmitting terminal and the first receiving terminal is identical to the route on the network between the transmitting terminal and the second receiving terminal. Thus, when both routes on the network are not identical to each other, the packet loss history information is not transferred to the second receiving terminal. Therefore, such a situation can be prevented that the second receiving terminal receives the streaming at an inadequately high transmission rate to bring about a congestion state of the network.

Also, a communication method of the present invention of adding a second receiving terminal in addition to a first receiving terminal, as a receiving terminal of a streaming that is distributed in a multicast while undergoing a rate control using TFRC, includes a deciding step of deciding whether or not a route on a network between a transmitting terminal of the streaming and the first receiving terminal is identical to a route on the network between the transmitting terminal and the second receiving terminal; and a transferring step of transferring history information of a packet loss that the first receiving terminal is managing to the second receiving terminal when it is decided that both routes are identical.

According to this configuration, when it is decided that both routes are identical, the first receiving terminal transfers the packet loss history information that the first receiving terminal is managing to the second receiving terminal. Thus, the second receiving terminal can receive the streaming immediately by using the transferred history information at the same transfer rate as that the first receiving terminal is using, without execution of the slow start. Therefore, the streaming can be received and played without a pause immediately after the second receiving terminal is added in addition to the first receiving terminal.

Also, according to this configuration, it is decided whether or not the route on the network between the streaming transmitting terminal and the first receiving terminal is identical to the route on the network between the transmitting terminal and the second receiving terminal. Thus, when both routes on the network are not identical, the packed loss history information is not transferred to the second receiving terminal. Therefore, such a situation can be prevented that the second receiving terminal receives the streaming at an inadequately high transmission rate to bring the network into a congestion state.

Also, the communication method of the present invention further includes an informing step of informing the transmitting terminal and the second receiving terminal that the history information of the packet loss has been transferred from the first receiving terminal to the second receiving terminal when it is decided that both routes are identical, and informing the transmitting terminal and the second receiving terminal that the history information of the packet loss has not been transferred from the first receiving terminal to the second receiving terminal and only a switching of the receiving terminal has been conducted when it is decided that both routes are not identical. According to this configuration, the transmitting terminal and the second receiving terminal can grasp a situation.

Also, in the communication method of the present invention, the deciding step measures the route by means of traceroute.

Also, in the communication method of the present invention, the deciding step decides whether or not the first receiving terminal and the second receiving terminal are connected to a same network, and decides whether or not only one router is connected to the same network from the transmitting terminal.

Also, a receiving terminal of the present invention of a streaming to which a rate control using TFRC is applied, includes a deciding function of deciding whether or not a route on a network between a transmitting terminal of the streaming and own terminal is identical to a route on the network between the transmitting terminal and another receiving terminal; and a transferring function of transferring history information of a packet loss that own terminal is managing to the another receiving terminal when it is decided that both routes are identical.

Also, a receiving terminal of the present invention of a streaming that is distributed in a multicast while undergoing a rate control using TFRC, includes a deciding function of deciding whether or not a route on a network between a transmitting terminal of the streaming and own terminal is identical to a route on the network between the transmitting terminal and a receiving terminal that is added newly as a terminal that receives the streaming; and a transferring function of transferring history information of a packet loss that own terminal is managing to the receiving terminal that is added newly when it is decided that both routes are identical.

ADVANTAGE OF THE INVENTION

According to the present invention, the streaming can be received/played immediately after a switching (adding) operation not to be disconnected when the terminal to receive the streaming is switched from the first receiving terminal to the second receiving terminal (or the second receiving terminal is added as the receiving terminal).

BRIEF DESCRIPTION OF THE DRAWINGS

FIG. 10 A view explaining an example of a message containing a loss history.

Figure 1:
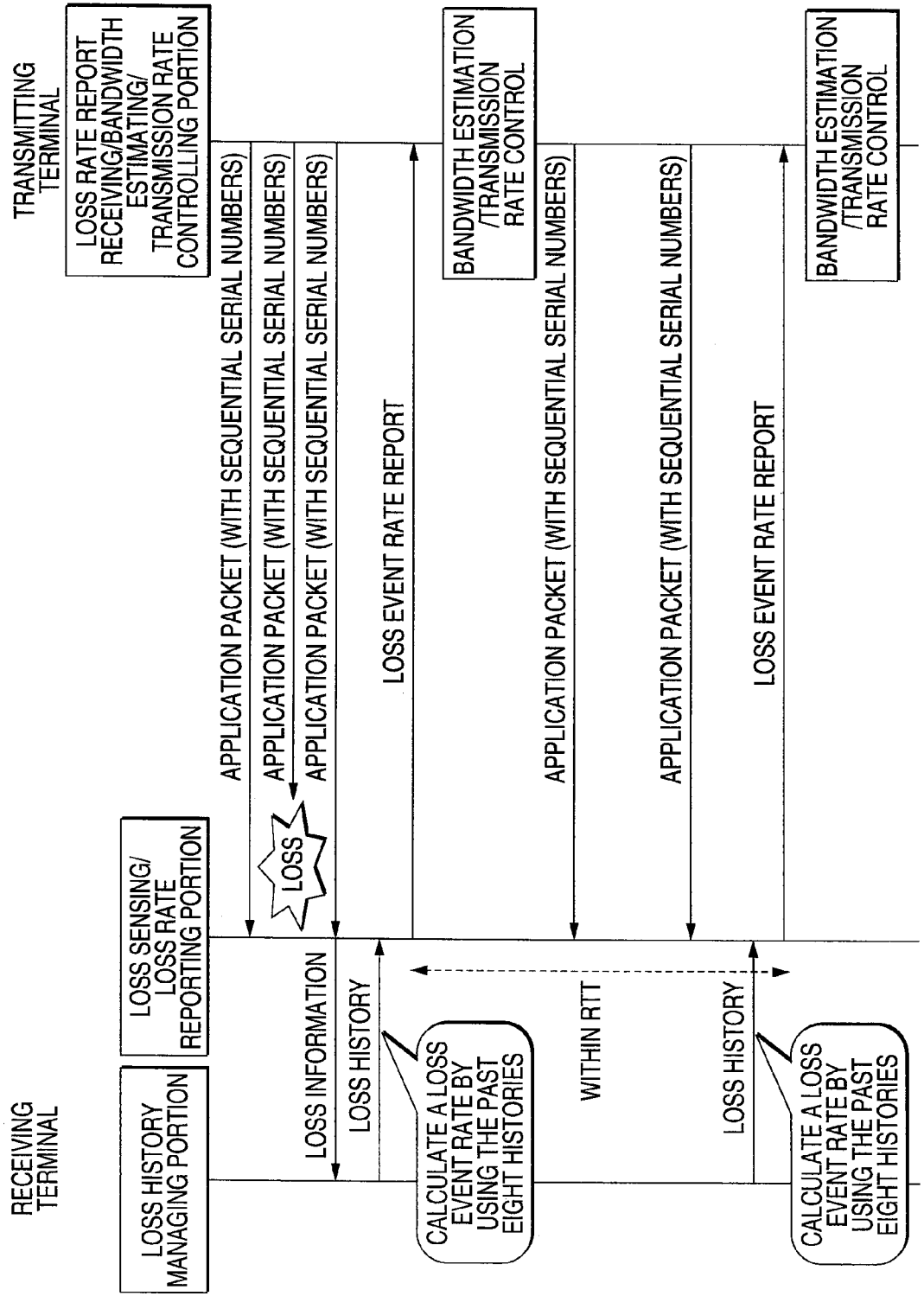
FIG. 1 An explanatory view of transmission rate control using TFRC.

DESCRIPTION OF REFERENCE NUMERALS AND SIGNS 101 transmitting terminal
102 transmitting application
103 transmission rate controlling portion
104, 206, 306 call transfer controlling portion
201 first receiving terminal
202, 302 receiving application
203, 303 loss history managing portion
204, 304 loss rate reporting portion
205 route-associated information reporting portion
207 same route deciding portion
301 second receiving terminal
305 route-associated information reporting portion
401 router
501 Internet
502 route on the Internet
601 call control server
701 first network (local network)
702 second network

BEST MODE FOR CARRYING OUT THE INVENTION

Embodiments of the present invention will be explained with reference to the drawings hereinafter.

FIG. 1 is an explanatory view of transmission rate control using the above TFRC. In this control, when the application packet is transmitted from the transmitting terminal to the receiving terminal, the transmission rate control is carried out by estimating a bandwidth from Eq. (1) by utilizing packet loss history information and a round trip time measured on the receiving terminal side. Embodiments applied when the terminal for receiving the streaming transmitted from the transmitting terminal, which applies the transmission rate control using this TFRC algorithm to the streaming, is changed or added will be explained hereinafter.

Embodiment 1

Centralized Control by Using a Call Control Server

Figure 2:
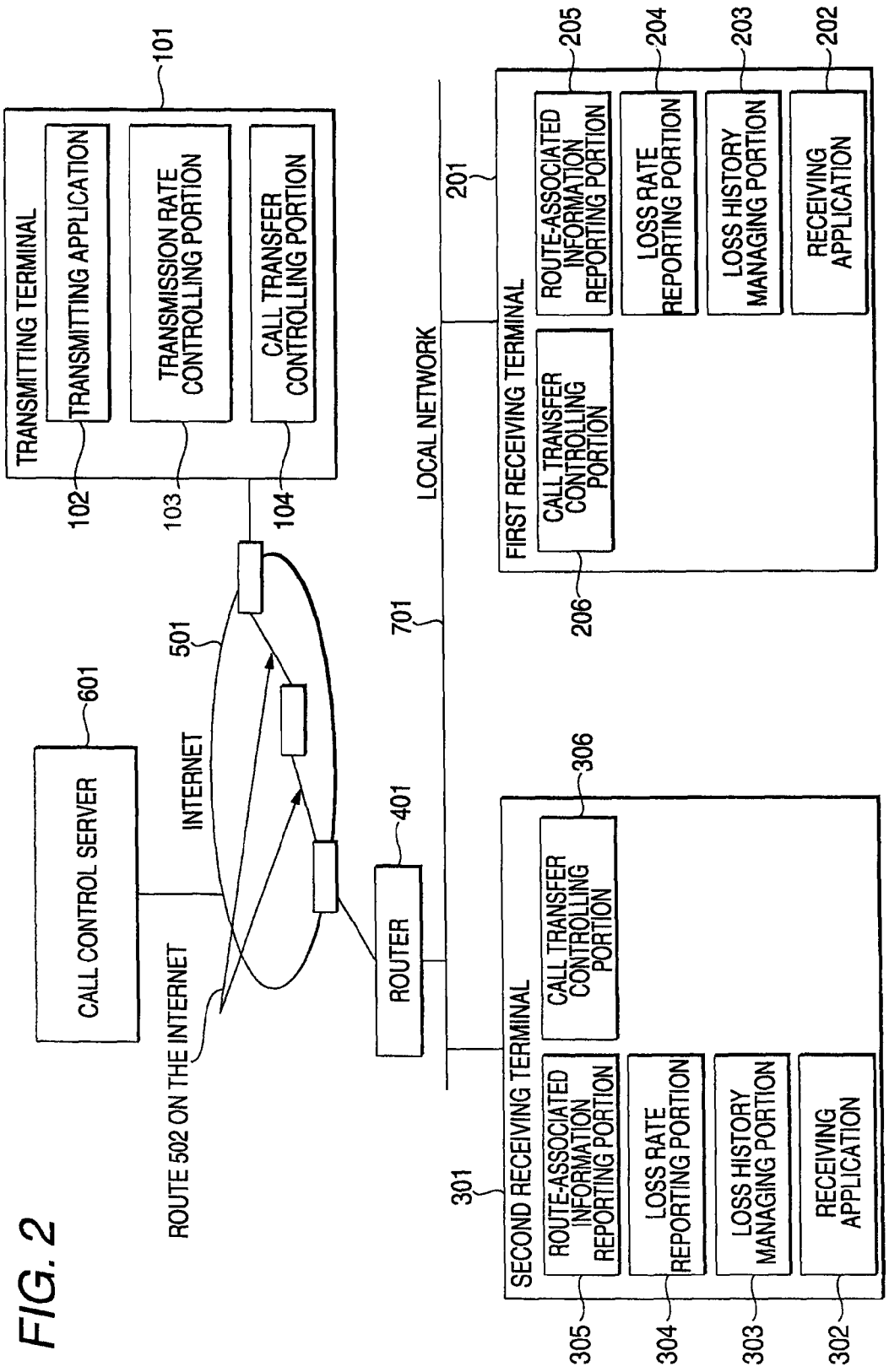
FIG. 2 A block diagram showing a configuration of a communication system to explain Embodiment 1 (equipped with a call control server).

FIG. 2 is a block diagram showing a configuration of a communication system to explain Embodiment 1 of the present invention. The communication system shown in FIG. 2 is constructed by a transmitting terminal 101, a first receiving terminal 201, a second receiving terminal 301, a router 401, a call control server 601, the Internet 501, and a local network 701. Also, the transmitting terminal 101, the call control server 601, and the router 401 are connected mutually via the Internet 501. The router 401 is connected to the first receiving terminal 201 and the second receiving terminal 301 via the local network 701.

The transmitting terminal 101 is a terminal that transmits the streaming, and contains a transmitting application 102, a transmission rate controlling portion 103, and a call transfer controlling portion 104. The transmitting application 102 is an application that transmits streaming information such as sound, moving picture, and the like. The transmission rate controlling portion 103 receives a loss event rate and a round trip time information as RTT (Round Trip Time) from the receiving terminal described later, then estimates a bandwidth by using Eq. (1), and then controls a transmission rate of the transmitting application 102 based on this bandwidth. The call transfer controlling portion 104 transmits/receives the call control signaling to/from the terminal and the call control server, and controls start and end of streaming transmission.

The first receiving terminal 201 is a terminal that receives the streaming. The first receiving terminal 201 contains a receiving application 202 for play the streaming data such as sound, moving picture, etc. by a speaker, a display, or the like, a loss history managing portion 203 for managing a loss situation of the received packet, a loss rate reporting portion 204 for sensing the loss by monitoring the sequential serial numbers of the packets of the streaming transmitted from the transmitting terminal 101, then calculating a loss event rate based on the loss and loss history information managed by the loss history managing portion 203, and then reporting the rate as a loss event rate to the transmitting terminal 101, a route-associated information reporting portion 205 for measuring/reporting the information required to decide that the route on the Internet between the transmitting terminal 101 and own terminal is identical to the route on the Internet between the transmitting terminal 101 and other receiving terminal, and a call transfer controlling portion 206 for transmitting/receiving the call control signaling to/from other terminal and the call control server 601 and controls start and end of the streaming reception.

The second receiving terminal 301 is a terminal that receives the streaming like the first receiving terminal 201. The second receiving terminal 301 is constructed by a receiving application 302 equivalent to the receiving application 202, a loss history managing portion 303 equivalent to the loss history managing portion 203, a loss rate reporting portion 304 equivalent to the loss rate reporting portion 204, a call transfer controlling portion 306 equivalent to the call transfer controlling portion 206, and a route-associated information reporting portion 305 for measuring/reporting the information required to decide that the route on the Internet between the transmitting terminal 101 and own terminal is identical to the route on the Internet between the transmitting terminal 101 and other receiving terminal.

Also, in FIG. 2, the router 401 is a router provided in a house, or the like, and the first receiving terminal 201 and the second receiving terminal 301 are connected to the router 401 via the local network 701. The router 401 is connected to the Internet 501. Here, 502 shows schematically a route on the Internet between the transmitting terminal 101 and the router 401.

The call control server 601 is a call control server that transmits/receives the call control signaling to/from the call transfer controlling portion 104 of the transmitting terminal 101, the call transfer controlling portion 206 of the first receiving terminal 201, and the call transfer controlling portion 306 of the second receiving terminal 301, or relays the call control signaling.

Next, an operation of switching the receiving terminal that receives the stream such as sound, moving picture, and the like, to which the transmission rate control in terms of TFRC is applied by the transmitting terminal 101, from the first receiving terminal 201 to the second receiving terminal 301 in the above configuration will be explained with reference to the drawings hereunder.

Figure 3:
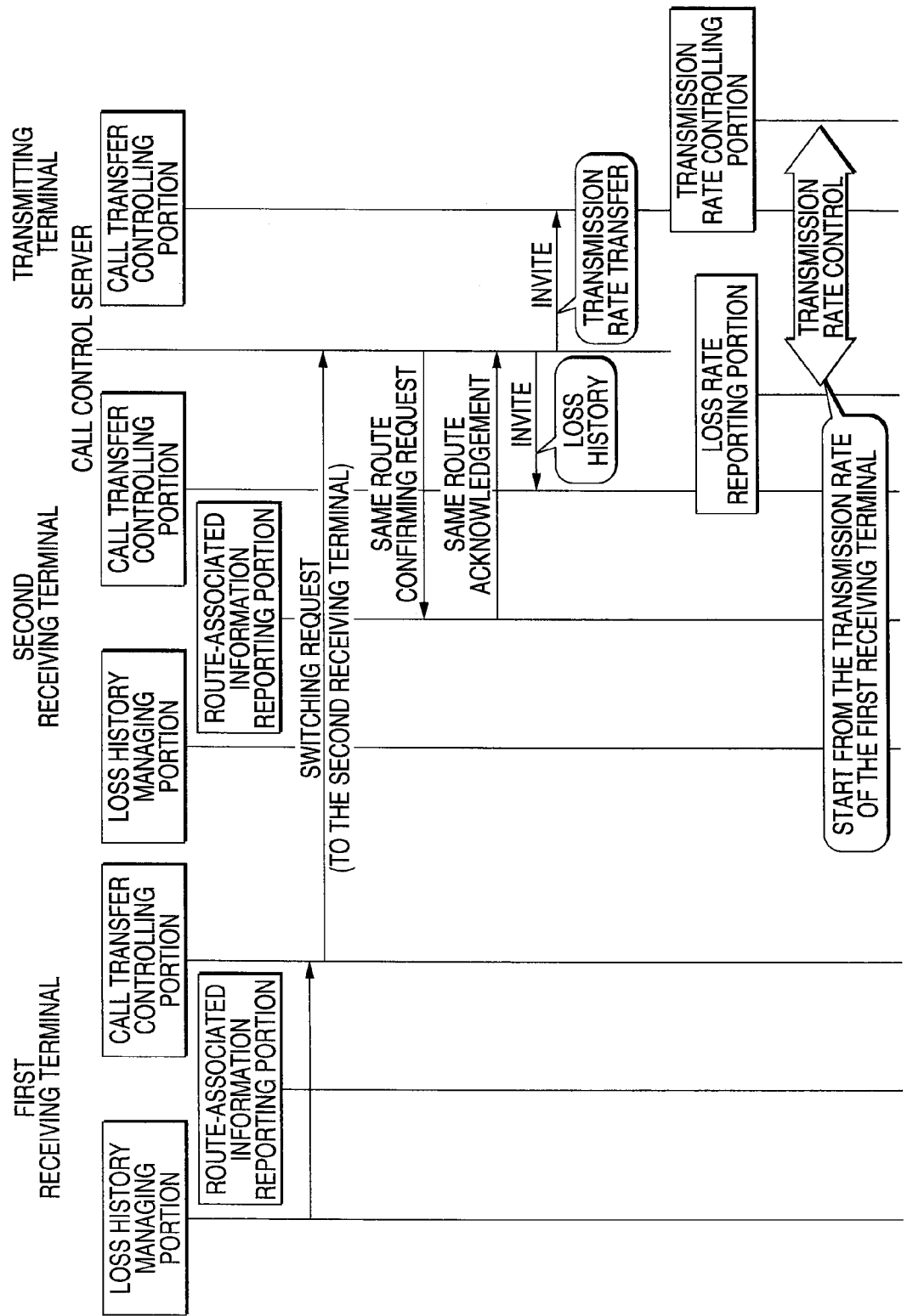
FIG. 3 An explanatory view explaining a switching operation of a streaming receiving terminal in Embodiment 1 (the case where the same route is taken).

FIG. 3 is an explanatory view explaining a switching operation of the streaming receiving terminal in Embodiment 1 (the case where the same route is taken). FIG. 3 shows sequences in which the switching operation is executed by using SIP (Session Initiation Protocol) as the system for transmitting/receiving the call control sequences, while applying a centralized control by the call control server. First, the loss history managing portion 203 of the first receiving terminal 201 informs the call transfer controlling portion 206 of the loss history information. The call transfer controlling portion 206 of the first receiving terminal 201 sends a switching request message to the call control server 601 to switch the receiving terminal from the first receiving terminal to the second receiving terminal 301. In this message, URI (Uniform Resource Identifier) used to specify the second receiving terminal 201, an identifier CALL-ID used to specify the communication (streaming) that is handled now the transmitting terminal 101 and the receiving terminal, the information indicating the route on the Internet between the transmitting terminal 101 and the first receiving terminal 201, and the loss history information that is being managed in the loss history managing portion 203 are contained.

The call control server 601 interprets contents of this switching request message, and specifies the second receiving terminal 301. Also, the call control server 601 transmits a same route confirming request message containing IP address information of the transmitting terminal 101 to the second receiving terminal 301, as the information needed to measure the route on the Internet between the transmitting terminal 101 and the second receiving terminal 301. The route-associated information reporting portion 305 of the second receiving terminal 301, when received the same route confirming request message, measures the route between the transmitting terminal 101 and the second receiving terminal 301 by using the IP address information of the transmitting terminal 101 contained in the same route confirming request message. Then, the route-associated information reporting portion 305 includes the measured route information in a same route acknowledgement and replies the acknowledgement to the call control server 601.

The call control server 601, when received the same route acknowledgement, decides that the route on the Internet between the transmitting terminal 101 and the first receiving terminal 201 is identical to the route on the Internet between the transmitting terminal 101 and the second receiving terminal 301, by using this route information. This decision is called a route identity decision. When it is decided by this route identity decision that both routes on the Internet are identical to each other, the call control server 601 informs the second receiving terminal 301 of a message (an INVITE message in FIG. 3) containing the loss history information of the first receiving terminal 201. Also, the call control server 601 transmits a transmission rate transfer message (an INVITE message in FIG. 3) describing that the same transmission rate as the first receiving terminal 201 is applied to the second receiving terminal 301, to the transmitting terminal 101.

FIG. 10 is a view explaining an example of a format of the message containing the loss history information. In FIG. 10, 1101 is an example of the INVITE message according to SIP (Session Initiation Protocol) stipulated by the Internet standard document RFC2543. Also, 1102 is an example of a main body of the message in SDP (Session Description Protocol) format stipulated by the draft "draft-ietf-mmusic-sdp-new-25.txt" in conformity to the Internet. Also, 1103 is a descriptive example of the loss history information. Also, 1104 is a symbol used to specify the "attribute" description in SDP.

Also, 1105 shows a type of the attribute, and 1106 shows a value of the attribute. The attribute value 1106 is described by the text that is marked off with a comma. Also, 1107 is a character giving the number of the attribute values indicating how many attributes are contained. Respective texts that are aligned from 1108 to 1109 and marked off with a comma are information indicating the loss history.

In the present descriptive example, the information indicating the loss history indicates the number of packets recorded between a certain packet loss and a subsequent packet loss, i.e., is given by recording the number of packets indicating a loss interval. That is, the texts that are aligned from 1108 to 1109 and marked off with a comma indicate the history of the loss interval. For example, this information indicates such a situation that a packet loss occurs after a packet 1024 reached since the first packet loss occurred, and then a packet loss occurs again after a packet 2000 reached. The loss history information may be represented by the number of packets that are received until the loss event occurs, like the present embodiment. Alternately, a reciprocal number of this number may be represented as the loss event rate. Also, a time interval at which the loss event occurs and a reception rate of streaming data that the receiving terminal is receiving at that time may be transferred as the loss history information. Also, in the present embodiment, an example where eight pieces of loss history information are transmitted is illustrated, but the present invention is not restricted to this example. That is, finite pieces in excess of one may be transmitted. In the present embodiment, the system that is based on the SDP (Session Description Protocol) format stipulated by "draft-ietf-mmusic-sdp-new-25.txt" is illustrated as the loss history information describing system. But the loss history information may be described by a SDPng format stipulated by "draft-ietf-mmusic-sdpng-0.8txt" that describes the session information on a XML (Extensible Markup Language) basis, or may be described by other describing system.

The second receiving terminal 301, when received the message containing the loss history information, reflects this loss history information on the loss rate reporting portion 304, and holds the transmission history that is equal to that in the first receiving terminal 201. More particularly, the second receiving terminal 301 holds the history information at a loss interval described from 1108 to 1109 shown in FIG. 10 as the loss history information. Then, the second receiving terminal 301 generates the information necessary for the rate control based on TFRC (i.e., transmission rate transfer message) by using this loss history information, and transmits this information to the transmitting terminal 101. The call transfer controlling portion 104 of the transmitting terminal 101, when received the transmission rate transfer message, controls the transmission rate controlling portion 103 and the transmitting application 102 to apply the same transmission rate as the transmission rate applied to the first receiving terminal 201 to the second receiving terminal 301 as an initial value.

According to such operation, first the transmission rate that is being applied to the transmission of the streaming from the transmitting terminal 101 to the first receiving terminal 201 is applied as the initial value of the streaming from the transmitting terminal 101 to the second receiving terminal 301 just before the receiving terminal that should receive the streaming is switched from the first receiving terminal 201 to the second receiving terminal 301. Also, a transmission rate controlling operation conducted between the transmitting terminal 101 and the second receiving terminal 301 after the switching takes over the loss history information of the first receiving terminal 201. As a result, the operation equivalent to the transmission rate controlling operation conducted between the transmitting terminal 101 and the first receiving terminal 201 can be still continued between the transmitting terminal 101 and the second receiving terminal 301 after the switching of the receiving terminal.

Here, the above route identity decision can be carried out by applying the route deciding method called a traceroute to the route between the transmitting terminal 101 and the receiving terminal. This traceroute means the route measuring method utilizing such an event that the router on the Internet sends back ICMP to the sender terminal when TTL (Time To Live) information given to the packet becomes 0. The route on the Internet between particular terminals can be measured by using this method. As the concrete application method, there can be utilized (1) a method of applying the traceroute from the receiving terminal to the transmitting terminal, (2) a method of applying the traceroute from the transmitting terminal to the receiving terminal, and (3) a method of confirming an event that the first and second receiving terminals are connected via the same router under particular conditions described later.

FIG. 3 shows the sequences taken under the assumption that the method (1) is carried out, i.e., the traceroute is applied from the receiving terminal to the transmitting terminal. Similarly, the route identity decision can be carried out by applying the traceroute from the transmitting terminal to the receiving terminal. In this case, first the call control server 601 transmits the same route confirming request message containing IP addresses of the first and second receiving terminals 201, 301 to the call transfer controlling portion 104 of the transmitting terminal 101. Then, the call transfer controlling portion 104 measures the routes to the first and second receiving terminals 201, 301 by using the traceroute, then writes the measured result in the same route acknowledgement message, and then sends back the message to the call control server 601.

Here, this same route deciding method can be accomplished by a simpler method when the first receiving terminal 201 and the second receiving terminal 301 are connected to the same local network 701 and also it can be confirmed that there is no route on the local network 701 except the route that goes through the router 401. That is, the method set forth in above (3) is the method that decides the route as the same route when two conditions described later are satisfied. Two conditions are that the local networks to which the first receiving terminal 201 and the second receiving terminal 301 are connected are the same local network (3-1) and the streaming from the transmitting terminal 101 to the first receiving terminal 201 is distributed via the router 401 (3-2). This method is effective when it can be decided that the local networks such as the in-house network, and the like are connected to a single ISP (3-P1) and the tunneling communication is not being applied to the first and second receiving terminals (3-P2).

The confirmation of (3-P1) is carried out based on the response issued from all routers as the multicast group in which all routers are joined when the first and second receiving terminals are connected to the local networks. That is, the condition of (3-P1) can be decided by issuing the response request (example: ping 6) to all routers (example: ff02::2 in case of IPv6) and then confirming that the response is issued from one router only.

In present Embodiment 1, the method of containing the loss history information in the switching request message is explained. In this case, in the sequences in FIG. 3, the call control server may inquire of the first receiving terminal 201 about the loss history information after the route identity decision is made.

Figure 4:
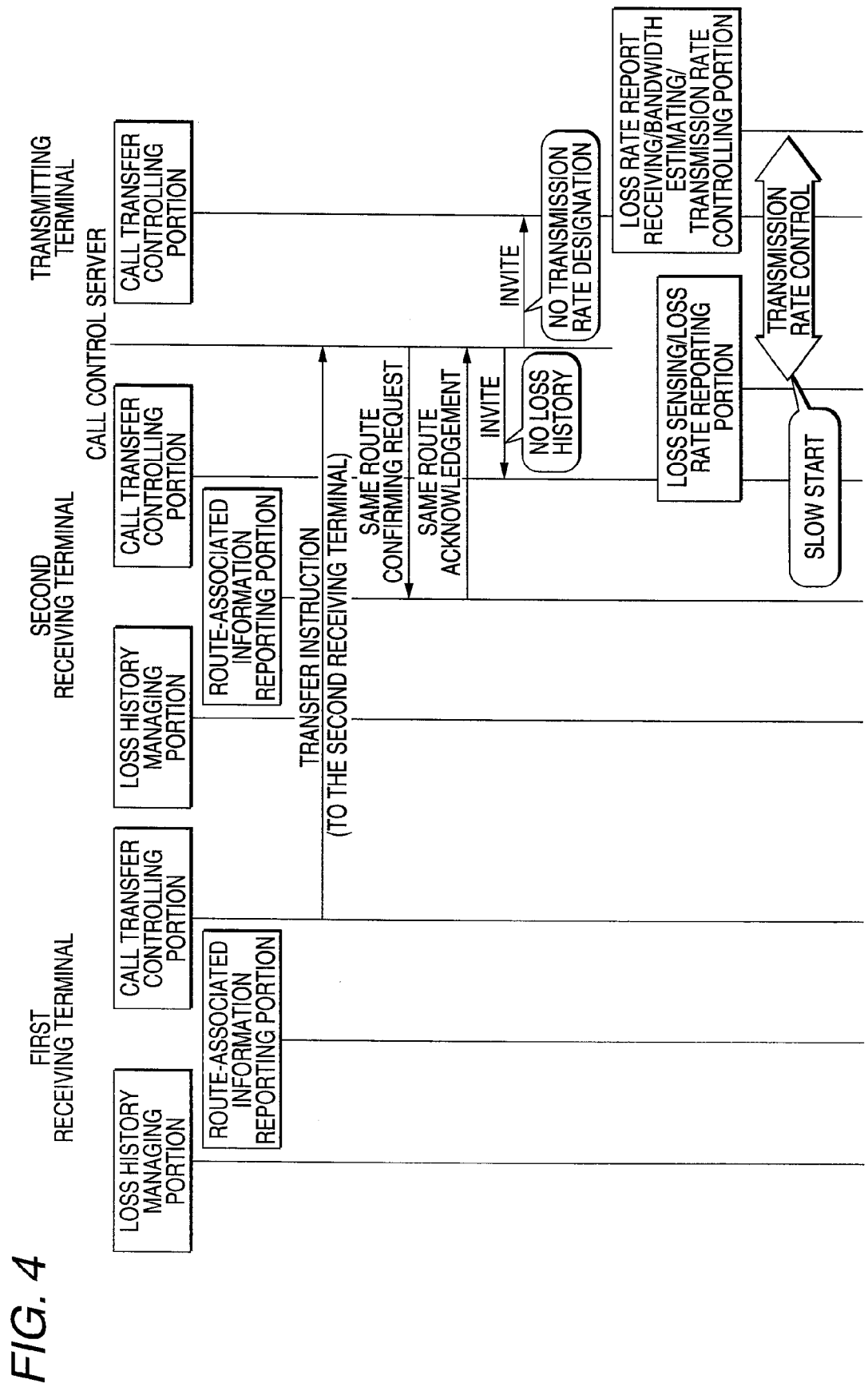
FIG. 4 An explanatory view explaining a switching operation of a streaming receiving terminal in Embodiment 1 (the case where the same route is not taken).

FIG. 4 is an explanatory view explaining the switching operation of the streaming receiving terminal in Embodiment 1 (the case where the same route is not taken), and is the sequences taken when it is decided that the same route is not taken, in the route identity decision in present Embodiment 1. In FIG. 4, respective sequences taken up to the same route acknowledgement are identical to those in FIG. 3. Based on the same route acknowledgement, the call control server 601 decides whether or not the route on the Internet between the transmitting terminal 101 and the first receiving terminal 201 is identical to the route on the Internet between the transmitting terminal 101 and the second receiving terminal 301. If it is decided that both routes are not identical to each other the call control server 601 informs the second receiving terminal 301 and the transmitting terminal 101 that the transfer of the streaming is conducted without the handover of the transmission rate (INVITE message in FIG. 4). The second receiving terminal 301 when received this message initializes the loss history managing portion 303 to prepare for a reception of the streaming from the transmitting terminal 101. The call transfer controlling portion 104 of the transmitting terminal 101 increases a transmission rate in compliance with the slow start algorithm of TFRC, without the application of the transmission rate that is being applied to the first receiving terminal 201. As a result, the streaming cannot be played in the second receiving terminal 301 until the transmission rate of the streaming comes up to a target transmission rate after the switching, but the switching itself of the receiving terminal can be completed.

In other words, in the transmission rate transferring method of the present embodiment, processing procedures in the transmission rate transferring method applied when the streaming receiving terminal for executing the transmission rate control by estimating a bandwidth based on the packet loss history information and the round trip time information is changed from the first receiving terminal 201 to the second receiving terminal 301 contains following steps. That is, the transmission rate transferring method contains a deciding step (1) of deciding whether or not the route on the network between the transmitting terminal 101 and the first receiving terminal 201 is identical to the route on the network between the transmitting terminal 101 and the second receiving terminal 301, a transferring step (2) of transferring the packet loss history information that the first receiving terminal 201 is managing to the second receiving terminal 301 when it is decided by the deciding step (1) that both routes are identical to each other, and an informing step (3) of informing the transmitting terminal 101 and the second receiving terminal 301 that the transmission rate has been passed from the first receiving terminal 201 to the second receiving terminal 301 when it is decided by the deciding step (1) that both routes are identical to each other or informing the transmitting terminal 101 and the first receiving terminal 201 that the transmission rate has not been passed from the first receiving terminal 201 to the second receiving terminal 301 but only the receiving terminal has been changed when it is decided by the deciding step (1) that both routes are not identical to each other. Thus, the receiving terminal is changed by respective steps (1),(2), (3).

According to this configuration, when it is decided that both routes are identical to each other, the packet loss history information that the first receiving terminal 201 is managing is transferred to the second receiving terminal 301. Thus, the second receiving terminal 301 can receive immediately the streaming at the same transmission rate as the transmission rate that the first receiving terminal 201 is using, by using the transferred history information without the execution of the slow start. Therefore, the streaming can be received and played without a disconnection immediately after the receiving terminal is switched.

Also, according to this configuration, it is decided that the route on the network between the transmitting terminal 101 and the first receiving terminal 201 is identical to the route on the network between the transmitting terminal 101 and the second receiving terminal 301. Thus, when both routes on the network are not identical to each other, the packet loss history information is not transferred to the second receiving terminal 301. Therefore, such a situation can be prevented that the second receiving terminal 301 receives the streaming at an inadequately high transmission rate to bring about a congestion state of the network.

Embodiment 2

Call Transfer without a Call Control Server

Figure 5:
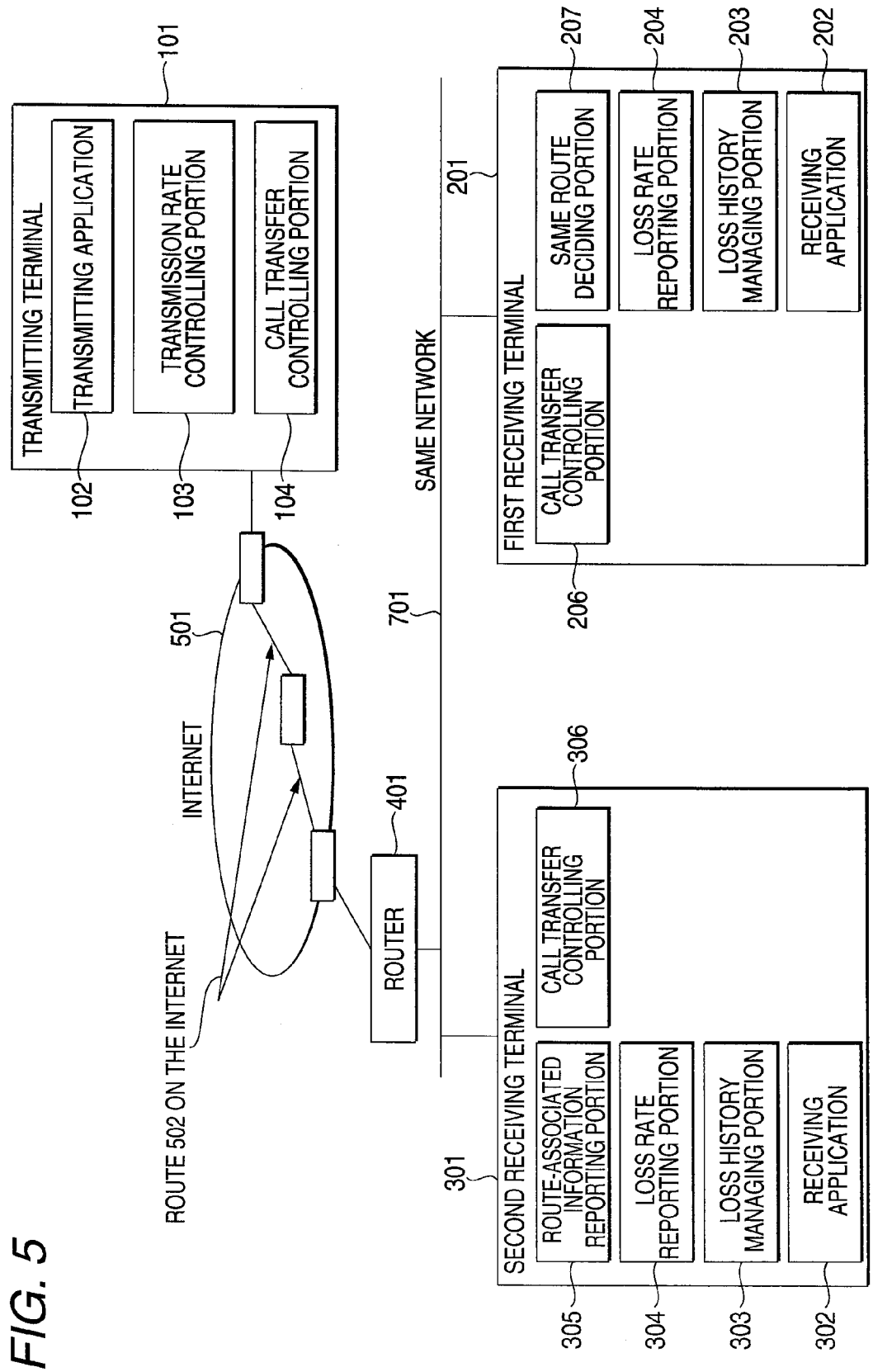
FIG. 5 A block diagram showing a configuration of a communication system to explain Embodiment 2 (not equipped with a call control server).

FIG. 5 is a block diagram showing a configuration of a communication system to explain Embodiment 2 of the present invention.

The communication system shown in FIG. 5 is not equipped with the call control server 601 that is provided to the communication system shown in FIG. 2. In FIG. 5, the portions 102, 103, 201, 202, 203, 204, 205, 302, 303, 304, 305, 401, 501, 502, 701 are identical to those in FIG. 2. In FIG. 5, the call transfer controlling portion 104 of the transmitting terminal 101, the call transfer controlling portion 206 of the first receiving terminal 201, and the call transfer controlling portion 306 of the second receiving terminal 301 controls start and end of the streaming reception by transmitting/receiving the call control signaling to/from other terminals, and have different functions from those explained in Embodiment 1. Also, the first receiving terminal 201 shown in FIG. 5 has a same route deciding portion 207 that decides whether or not the route on the Internet between the transmitting terminal 101 and own terminal is identical to the route on the Internet between the transmitting terminal 101 and other receiving terminal, instead of the route-associated information reporting portion 205 shown in FIG. 2. That is, the route-associated information reporting portion 205 in FIG. 2 has a function of measuring the route to respond when the transmitting terminal executes initiatively the route measurement, i.e., a function of confirming the fact that the first receiving terminal 201 and the second receiving terminal 301 are connected to the same network and both terminals have the same router 401 in the connection to the Internet. In contrast, the same route deciding portion 207 is different from the function of the route-associated information reporting portion 205 in that the receiving terminal has a function of executing initiatively the route measurement.

In this configuration, an operation of switching the terminal that receives the streaming such as sound, moving picture, and the like, to which the transmission rate control based on TFRC is applied by the transmitting terminal 101, from the first receiving terminal 201 to the second receiving terminal 301 will be explained hereunder.

Figure 6:
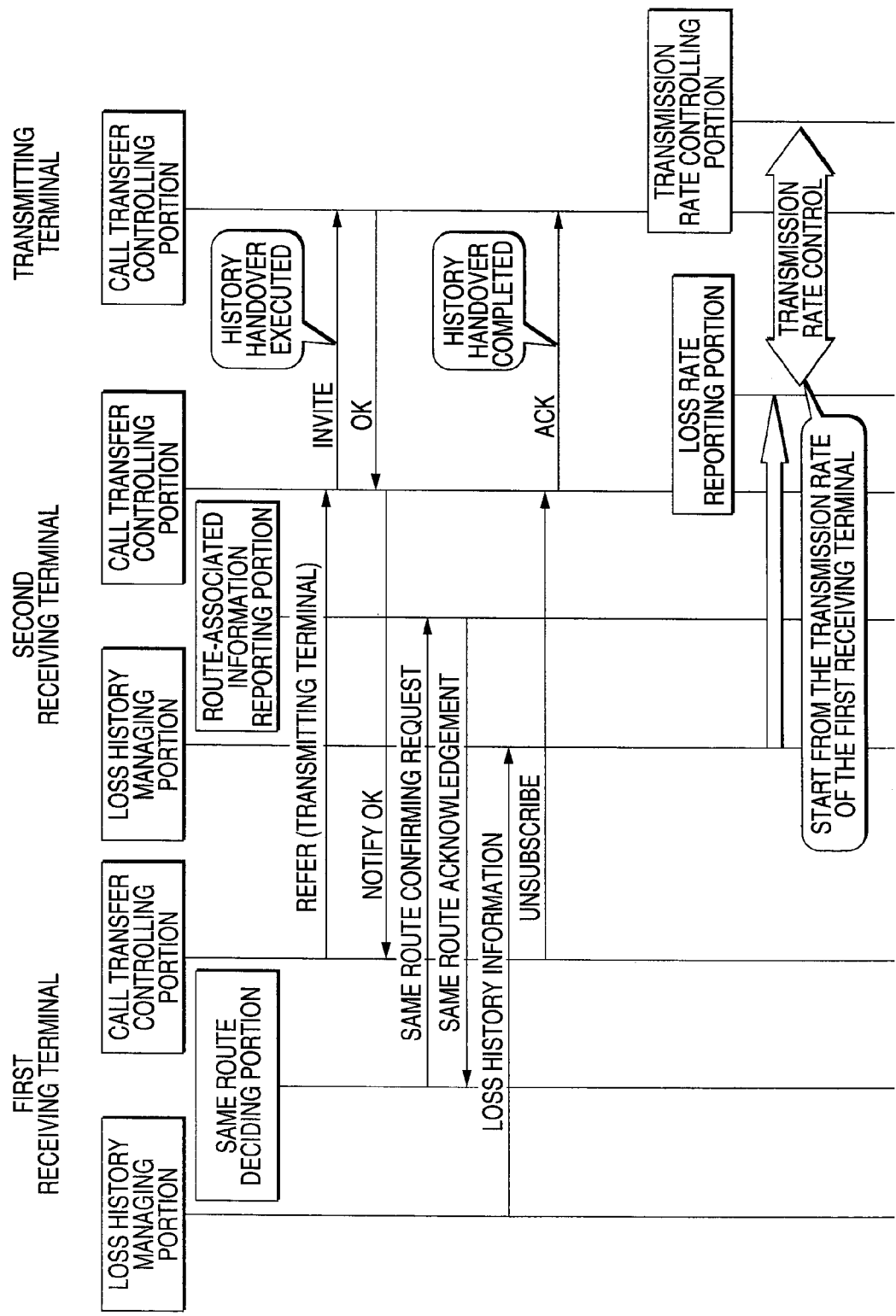
FIG. 6 An explanatory view explaining a switching operation of a streaming receiving terminal in Embodiment 2 (the case where the same route is taken).

FIG. 6 is an explanatory view explaining a switching operation of the streaming receiving terminal in Embodiment 2 (the case where the same route is taken). FIG. 6 shows the sequences taken when SIP is employed as the system for transmitting/receiving the call control sequences and the switching operation is carried out without the call control server.

First, a REFER (transmitting terminal) message to the effect that the receiving terminal should be switched is transmitted from the call transfer controlling portion 206 of the first receiving terminal 201 to the call transfer controlling portion 306 of the second receiving terminal 301. This REFER message contains URI used to specify the transmitting terminal 101 and SUBSCRIBE used to request a status information. The call transfer controlling portion 306 of the second receiving terminal 301, when received the REFER message, interprets the contents of this REFER message and then sends an INVITE message containing such a meaning that the handover of the transmission rate should be tried, to the transmitting terminal 101. Then, the call transfer controlling portion 306 receives an OK message as the response.

Then, the call transfer controlling portion 306 of the second receiving terminal 301 sends back a NOTIFY message as a state informing message responding to the SUBSCRIBE message to the first receiving terminal 201. The call transfer controlling portion 206 of the first receiving terminal 201, when received the NOTIFY message, senses that the call control operation has been executed normally in the transmitting terminal and the second receiving terminal 301, and then sends the same route confirming request message from the same route deciding portion 207 to the second receiving terminal 301. The route-associated information reporting portion 305 of the second receiving terminal 301 receives the same route confirming request message and then sends back the same route acknowledgement message. The same route confirming request message and the same route acknowledgement message are equivalent to those explained in Embodiment 1. The same route deciding portion 207 measures the route between the first receiving terminal 201 and the transmitting terminal 101. In the case where the route on the Internet between the transmitting terminal 101 and the first receiving terminal 201 is identical to the route on the Internet between the transmitting terminal 101 and the second receiving terminal 301, when the same route deciding portion 207 receives the same route acknowledgement message, the loss history managing portion 203 of the first receiving terminal 201 transmits the loss history information to the second receiving terminal 301 and also the call transfer controlling portion 206 transmits an UNSUBSCRIBE message to stop the state information by the NOTIFY.

Then, since the second receiving terminal 301 completes the handover of the loss history information, this second receiving terminal transmits the ACK message containing the instruction message to the effect that the same transmission rate as that applied to the first receiving terminal 201 should be applied to the streaming to the second receiving terminal 301, to the transmitting terminal 101. The call transfer controlling portion 104 of the transmitting terminal 101, when received this ACK message, controls the transmission rate controlling portion 103 and the transmitting application 102 to apply the same transmission rate as that applied to the first receiving terminal 201 to the streaming to the second receiving terminal 301.

Since such operation is taken, the same route deciding portion 207 can confirm the route between the first receiving terminal 201 and the transmitting terminal 101 and the route between the second receiving terminal 301 and the transmitting terminal 101 immediately before the receiving terminal for receiving the streaming is switched from the first receiving terminal 201 to the second receiving terminal 301. Therefore, the transmission rate applied to the transmission of the streaming from the transmitting terminal 101 to the first receiving terminal 201 is applied as the initial value of the streaming from the transmitting terminal 101 to the second receiving terminal 301. Also, the transmission rate controlling operation executed between the transmitting terminal 101 and the second receiving terminal 301 after the switching takes over the loss history information of the first receiving terminal 201. Therefore, the operation equivalent to the transmission rate controlling operation executed between the transmitting terminal 101 and the first receiving terminal 201 can be still continued.

Figure 7:
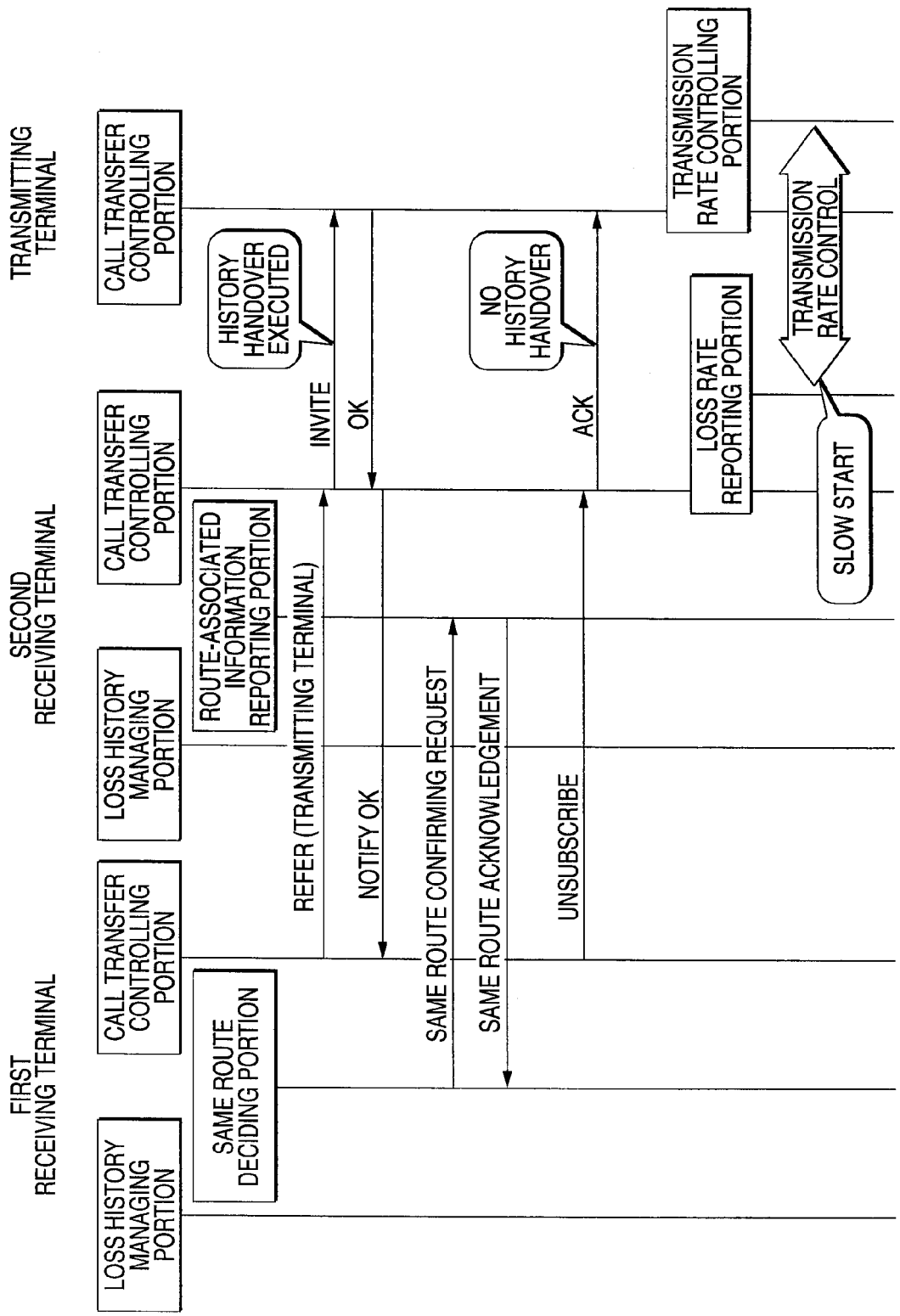
FIG. 7 An explanatory view explaining a switching operation of a streaming receiving terminal in Embodiment 2 (the case where the same route is not taken).

FIG. 7 is an explanatory view explaining the switching operation of the streaming receiving terminal in Embodiment 2 (the case where the same route is not taken). FIG. 7 shows the sequences applied when it is decided in the above route identity decision that both routes are not the same route. In FIG. 7, the sequences taken up to the same route acknowledgement are similar to those in FIG. 6. More particularly, the same route deciding portion 205 measures and decides whether or not the route between the first receiving terminal 201 and the transmitting terminal 101 is identical to the route between the second receiving terminal 301 and the transmitting terminal 101. At this time, when it is decided by the first receiving terminal 201 based on the same route acknowledgement that the route on the Internet between the transmitting terminal 101 and the first receiving terminal 201 is not identical to the route on the Internet between the transmitting terminal 101 and the second receiving terminal 301, the first receiving terminal 201 informs the second receiving terminal 301 of the effect that the streaming should be transferred without the handover of the transmission rate, by the UNSUBSCRIBE message.

The call transfer controlling portion 306 of the second receiving terminal 301, when received the UNSUBSCRIBE message, initializes the loss history managing portion 303 to prepare for the reception of the streaming from the transmitting terminal 101. Then, the call transfer controlling portion 306 of the second receiving terminal 301 contains the effect that the streaming has been transferred without the handover of the transmission rate in the ACK message, and then informs the call transfer controlling portion 104 of the transmitting terminal 101 of this ACK message. Then, the call transfer controlling portion 104 of the transmitting terminal 101, when received this ACK message, does not apply the transmission rate being applied to the first receiving terminal 201 and increases the transmission rate in compliance with the slow start algorithm of TFRC. As a result, the second receiving terminal 301 cannot regenerate (play) the streaming until the transmission rate of the streaming reaches a target transmission rate after the switching, but the switching itself of the receiving terminal can be completed.

Embodiment 3

Applied to the Multicast Distribution

Since a configuration of a communication system used to explain Embodiment 3 is identical to that shown in FIG. 5, its redundant explanation will be omitted herein. In the present Embodiment, the call transfer controlling portions 104, 206, and 306 in FIG. 5 control start and end of the streaming reception by transmitting/receiving the call control signaling to/from other terminal, and have the different functions from those explained in Embodiments 1 and 2. The transmission rate controlling portion 103 receives the information about an available bandwidth from the loss rate reporting portions 204, 304 described later, and transmits the streaming of the transmitting application at the slowest transmission rate. The loss rate reporting portions 204, 304 of the first and second receiving terminals 201, 301 calculate the transmission rate by using RTT and the loss event rate between transmitting terminal 101 and respective receiving terminals measured by the receiving terminal, and report this transmission rate to the transmitting terminal 101.

In this configuration, the problem caused when the second receiving terminal 301 is caused newly to receive the streaming such as sound, moving picture, etc., to which the transmission rate control of TFMCC (TCP-Friendly Multicast Congestion Control: Reference Literature, Internet draft "draft-ietf-rmt-bb-tfmcc-01.txt") is applied by the transmitting terminal 101, under the condition only the first receiving terminal 201 is now receiving such streaming, and also an operation taken to solve this problem will be discussed hereunder.

First, an outline of the TFMCC operation and the problem will be explained hereunder. The TFMCC is the system in which the transmission rate control of TFRC is applied to the multicast. The operations taken on the receiver side to sense a loss of packets, manage the history, and calculate the loss event rate by using the loss history information are equal to the operations of TFRC. In the TFMCC, the receiving terminal measures RTT between the transmitting terminal and the receiving terminal, and the receiving terminal estimates a transmission rate X based on RTT and the loss event rate by using Eq. (1). The receiving terminal reports this transmission rate X to the transmitting terminal, and then the transmitting terminal transmits the streaming at the slowest transmission rate among the receiving terminals.

In the normal operation of TFMCC, there existed such a problem that, when the receiving terminal is added newly, the slow start is made and thus the streaming cannot be played until the transmission rate of the streaming comes up to the target transmission rate.

Embodiment 3 provides a method capable of receiving continuously the streaming, which is subjected to the transmission rate control of the streaming based on TFMCC, at the same transmission rate when the receiving terminal is added newly. Next, an operation of present Embodiment 3 will be explained with reference to FIG. 8 hereunder.

Figure 8:
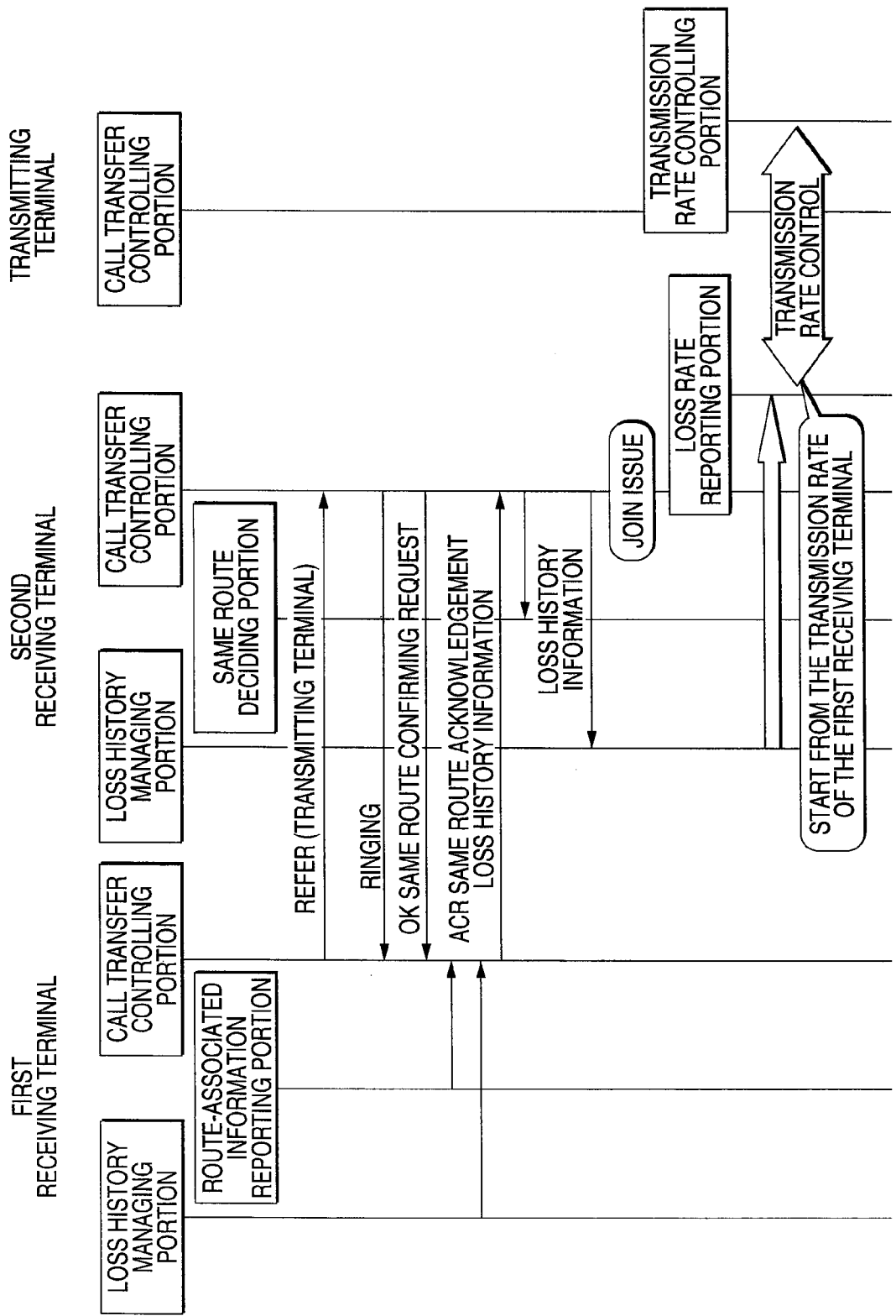
FIG. 8 An explanatory view explaining added operation of a streaming receiving terminal in Embodiment 3 (the case where the same route is taken).

FIG. 8 is an explanatory view explaining added operations of the streaming receiving terminal in Embodiment 3 (the case where the same route is taken). In present Embodiment, the case where the second receiving terminal 301 is caused to join newly will be explained. That is, in FIG. 8, the first receiving terminal 201 is the receiving terminal that is receiving the streaming up to now, while the second receiving terminal 301 is the receiving terminal that is added newly.

First, the call transfer controlling portion 206 of the first receiving terminal 201 transmits an INVITE message containing the multicast address information of the streaming that the transmitting terminal 101 is transmitting, to the call transfer controlling portion 306 of the second receiving terminal 301. The call transfer controlling portion 306 of the second receiving terminal 301 transmits a RINGING message as a response, and then transmits an OK message containing the same route confirming request. The call transfer controlling portion 206 of the first receiving terminal 201, when received the OK message, transmits an ACK message containing the loss history information and the same route acknowledgement to the second receiving terminal 301. The call transfer controlling portion 306 of the second receiving terminal 301, when received the ACK message, decides whether or not the route between the first receiving terminal 201 and the transmitting terminal 101 is identical to the route between the second receiving terminal 301 and the transmitting terminal 101, by using the same route deciding portion 207. This deciding method is similar to the method explained in Embodiment 2. When it is decided in the result of this route identity decision that the route on the Internet between the transmitting terminal 101 and the first receiving terminal 201 is identical to the route on the Internet between the transmitting terminal 101 and the second receiving terminal 301, the second receiving terminal 301 applies the loss history information to the loss history managing portion 303.

Then, the second receiving terminal 301 starts the procedures to receive the multicast address recited in the INVITE message. More concretely, in the case of IPv4, the call transfer controlling portion 306 transmits a JOIN message based on IGMP (Internet Group Management Protocol) or MLD (Multicast Listener Discovery: Reference Literature RFC2710, Internet draft "draft-holbrook-idmr-igmpv3-ssm-07.txt"), and controls the receiving application and the network interface and the driver of the receiving terminal so as to receive the multicast data.

Since such operation is executed, the second receiving terminal 301 can receive the streaming that is transmitted in the multicast. Also, an available bandwidth that the second receiving terminal 301 reports to the transmitting terminal 101 is calculated at this time based on the loss history information received from the first receiving terminal 201. As a result, the loss rate reporting portion 304 of the second receiving terminal 301 and the loss rate reporting portion 204 of the first receiving terminal 201 report the same loss rate to the transmitting terminal 101. The transmission rate controlling portion 103 of the transmitting terminal 101 executes the control such that the streaming should be transmitted to fit in with the slowest receiving terminal. However, since the loss rates reported from the first receiving terminal 201 and the second receiving terminal 301 are equal and the route between the transmitting terminal 101 and the first receiving terminal 201 and the route between the transmitting terminal 101 and the second receiving terminal 301 are identical, respective round trip times also become equal. Accordingly, the available bandwidths calculated by Eq. (1) have also the same numerical values. That is, since the second receiving terminal 301 joins the multicast group while reporting the transmission rate equivalent to the first receiving terminal 201 to the transmitting terminal 101, the transmitting terminal 101 is not requested to lower the transmission rate. Therefore, the transmitting terminal 101 does not take the slow start and continues the same control as that executed before the second receiving terminal 301 joins, the transmission rate of the transmitting terminal 101 can be maintained.

As the result, even when the receiving terminal is newly added, the first receiving terminal 201 and the second receiving terminal 301 can receive continuously the same transmission rate as the initial value.

In Embodiment 3, it is supposed that the streaming is distributed in the multicast in which distribution trees on the Internet are built up when the receiving terminals issue the JOIN message, and the TFMCC is employed as the transmission rate control. But the streaming is not restricted to this system. For example, the streaming can also be realized when the distribution is carried out by XCAST (eXplicit Multicast: Reference Literature Y. Imai, M. Shin and Y. Kim, "XCAST6: explicit Multicast on IPv6", IEEE/IPSJ SAINT2003 Workshop 4, IPv6 and Applications, Orland, January 2003) as the multicast system and also the congestion control system using the sender-started multicast (Reference Literature: E. Muramoto, T. Yoneda, F. Suzuki, Y. Suzuki, A. Nakamura, "Proposal for Congestion Control Method in the Sender-started Multicast", Internet Conference 2003 Papers pp. 5-10, 2003/10) is applied as the transmission rate control system. More concretely, the second receiving terminal 301 is joined newly in the constituent elements shown in FIG. 5 in Embodiment 3 in accordance with the sequences explained by using FIG. 6. Thus, the first receiving terminal 201 and the second receiving terminal 301 can receive continuously the same transmission rate as the initial value.

Also, in Embodiment 3, the multicast distribution can be realized in the case where the centralized control is executed by introducing the call control server 601 explained in Embodiment 1.

In this manner, in present Embodiment, in the transmission rate transferring method applied when the second receiving terminal is added in addition to the first receiving terminal as the receiving terminal that receives the streaming distributed in the multicast while executing the transmission rate control by estimating the bandwidth based on the packet loss history information and the round trip time, there are contained a deciding step (1) of deciding whether or not the route on the network between the streaming transmitting terminal and the first receiving terminal is identical to the route on the network between the transmitting terminal and the second receiving terminal, a transferring step (2) of transferring the packet loss history information that the first receiving terminal is managing to the second receiving terminal when it is decided by the deciding step (1) that both routes are identical, and an informing step (3) of informing the transmitting terminal and the second receiving terminal that the transmission rate has been passed from the first receiving terminal to the second receiving terminal when it is decided by the deciding step (1) that both routes are identical, and informing the transmitting terminal and the second receiving terminal that the transmission rate has not been passed from the first receiving terminal to the second receiving terminal and only the receiving terminal has been added when it is decided by the deciding step (1) that both routes are not identical. Thus, the receiving terminal is added by respective steps (1),(2),(3).

According to this configuration, when it is decided that both routes are identical, the first receiving terminal 201 transfers the packet loss history information that the first receiving terminal is managing to the second receiving terminal 301. Thus, the second receiving terminal 301 can receive the streaming immediately by using the transferred history information at the same transfer rate as that the first receiving terminal 201 is using, without execution of the slow start. Therefore, the streaming can be received and played without a pause immediately after the second receiving terminal 301 is added in addition to the first receiving terminal 201.

Also, according to this configuration, it is decided whether or not the route on the network between the streaming transmitting terminal 101 and the first receiving terminal 201 is identical to the route on the network between the transmitting terminal 101 and the second receiving terminal 301. Thus, when both routes on the network are not identical, the packed loss history information is not transferred to the second receiving terminal 301. Therefore, such a situation can be prevented that the second receiving terminal 301 receives the streaming at an inadequately high transmission rate to bring the network into a congestion state.

Embodiment 4

Applied to the Case where a Plurality of Networks are Connected to a Router

Figure 9:
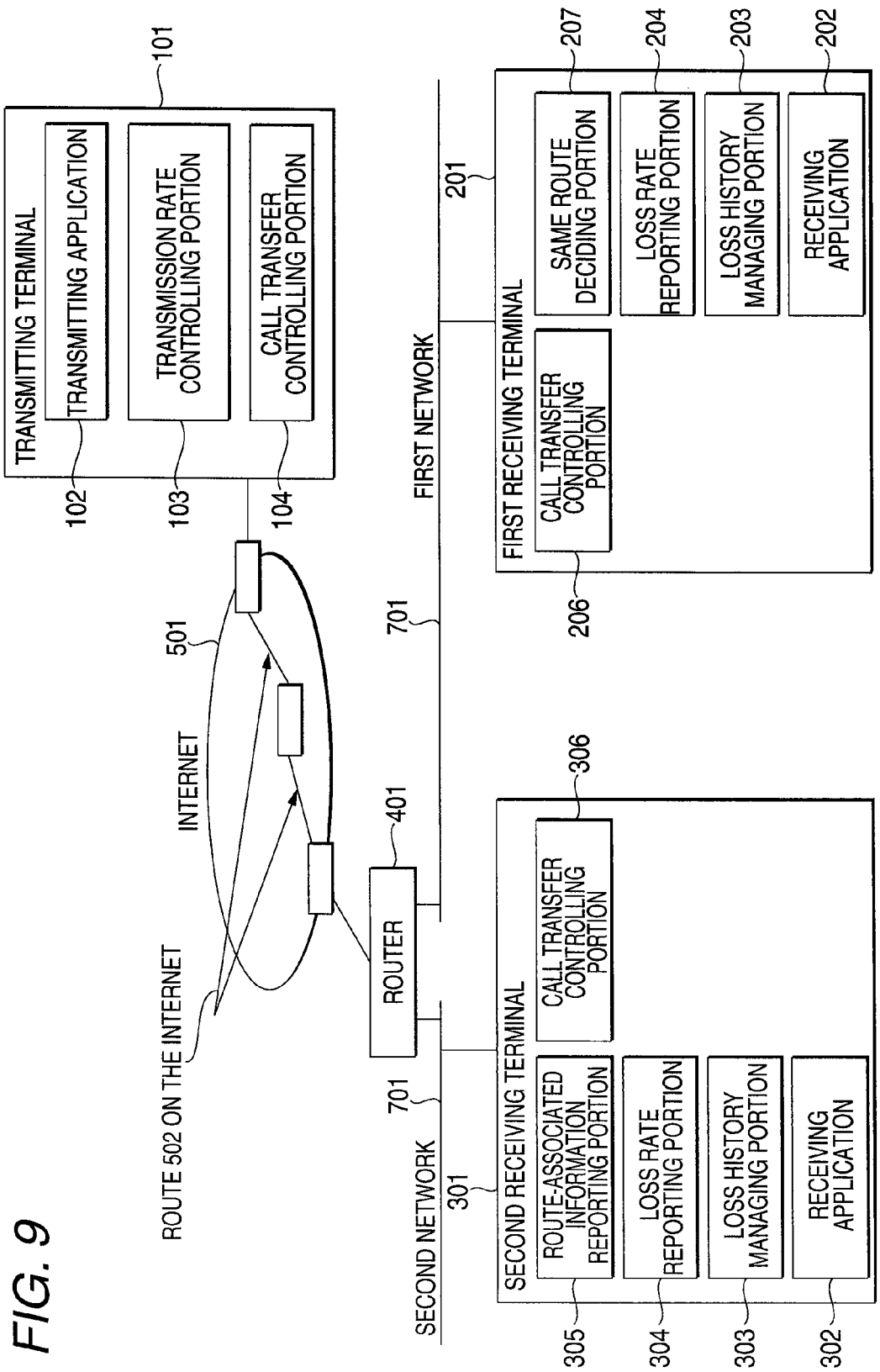
FIG. 9 A block diagram showing a configuration of a communication system (a router having two subnets) used to explain Embodiment 4.

FIG. 9 is a block diagram showing a configuration of a communication system (a router having two subnets) used to explain Embodiment 4.

The communication system shown in FIG. 9 is different from the communication system explained in other Embodiments in a connection relation between the networks. In FIG. 9, respective portions 101, 102, 103, 104, 201, 202, 203, 204, 207, 206, 301, 302, 303, 304, 305, 306, 401, 501, 502 are identical to those in FIG. 5. In FIG. 9, 701 denotes a first network to which the router 401 and the first receiving terminal 201 are connected, and 702 denotes a second network to which the router 401 and the second receiving terminal 301 are connected.

In this configuration, a practical method of switching the receiving terminal from the first receiving terminal 201 to the second receiving terminal 301 by using the sequences explained with reference to FIG. 6 will be explained hereunder. The same route deciding portion 207 can decide that the route on the Internet between the transmitting terminal 101 and the first receiving terminal 201 is identical to the route on the Internet between the transmitting terminal 101 and the second receiving terminal 301, by applying a following algorithm to the route identity decision.

(Algorithm Applied to Decide the Route Identity)
(Step 1) Confirm the identity of neighboring routers.
(Step 2) Confirm the identity of the routes between the neighboring routers and the transmitting terminal.

In above Step 1 and Step 2, it is decided that the routes on the Internet are identical mutually when the identity of the neighboring routers and the identity of the routes between the neighboring routers and the transmitting terminal 101 can be confirmed.

The Step 1 can be confirmed by using the traceroute explained in Embodiment 1. First, it is checked whether or not a first router (referred to as a "first hop router" hereinafter) in the result of the traceroute from the first receiving terminal 201 to the second receiving terminal 301 coincides with the first hop router in the result of the traceroute from the first receiving terminal 201 to the transmitting terminal 101. Also, it is checked whether or not the first hop router in the result of the traceroute from the second receiving terminal 301 to the first receiving terminal 201 coincides with the first hop router in the result of the traceroute from the second receiving terminal 301 to the transmitting terminal 101. In addition, it is checked whether or not only one router is provided between the first receiving terminal 201 and the second receiving terminal 301. This Step 1 can be confirmed if these three conditions can be checked.

Otherwise, the Step 1 can be confirmed by comparing the result of the traceroute from the transmitting terminal 101 to the first receiving terminal 201 with the result of the traceroute from the transmitting terminal 101 to the second receiving terminal 301.

In the above route identity deciding algorithm, it may be added as Step 3 that it is confirmed that the first receiving terminal 201 and the second receiving terminal 301 are not connected to the virtual interface like the tunneling interface. For example, such a case may be supposed that the first receiving terminal 201 sends a communication to the transmitting terminal 101 without the virtual interface such as IPv6 over IPv4 tunneling, or the like whereas the second receiving terminal 301 holds the tunneling communication such as VPN (Virtual Private Network) with the particular server on the Internet 501. In this case, the route between the second receiving terminal 301 and the transmitting terminal 101 takes sometimes the route via the particular server, unlike the route measured by the traceroute without the virtual interface. Therefore, a step of deciding whether or not the route measurement by not using the virtual interface becomes equal to the route measurement by using the virtual interface is added, and thus a quicker decision can be made in the same route deciding algorithm when both routes are not identical. In contrast, the same route decision can be made with higher measuring precision when both routes are identical.

Here, in the above route identity deciding algorithm, Step 1 can be confirmed by following procedures. First, the first and second receiving terminals 201, 301 issue the acknowledge request (e.g., ping 6) to all routers on the first and second networks 701, 702 respectively. Then, the first and second receiving terminals 201, 301 receives the responses from the routers, and put the query (example: Node Information Query stipulated in Internet draft "draft-ietf-ipngwg-icmp-name-lookups-10.txt", example: reverse search as the method of obtaining the name by executing the search using the IP address of DNS (domain name service) as a key) to the sender (router) of the responses about their names.

Step 2 can be confirmed by using the traceroute explained Example 1.

Because such operation is executed, the transmission rate applied to the transmission of the streaming from the transmitting terminal 101 to the second receiving terminal 201 is applied as the initial value of the streaming from the transmitting terminal 101 to the second receiving terminal 301 immediately before the receiving terminal for receiving the streaming is switched from the first receiving terminal 201 to the second receiving terminal 301. Also, the transmission rate controlling operation executed between the transmitting terminal 101 and the second receiving terminal 301 after the switching takes over the loss history information of the first receiving terminal 201. Accordingly, the operation equivalent to the transmission rate controlling operation executed between the transmitting terminal 101 and the second receiving terminal 201 can be still continued.

The present invention is explained in detail with reference to particular embodiments. But it is obvious for those skilled in the art that various variations and modifications can be applied without departing from a spirit and a scope of the present invention.

This application is based upon Japanese Patent Application (Patent Application No. 2005-003967) filed on Jan. 11, 2005; the contents of which are incorporated herein by reference.

INDUSTRIAL APPLICABILITY

The present invention possesses such an advantage that the streaming can be received/played not to be disconnected immediately after the switching (adding) operation when the terminal to receive the streaming is switched from the first receiving terminal to the second receiving terminal (or the second receiving terminal is added as the receiving terminal), and is useful to the communication method capable of changing the receiving terminal that receives the streaming in which the rate control using TFRC (TCP Friendly Rate Control) is executed from the first receiving terminal to the second receiving terminal, and the receiving terminal, and the like.

FIG. 1:
(1) receiving terminal
(2) transmitting terminal
(3) loss history managing portion
(4) loss sensing/loss rate reporting portion
(5) loss rate report receiving/bandwidth estimating/transmission rate controlling portion
(6) application packet (with sequential serial numbers)
(7) loss
(8) loss information
(9) loss history
(10) calculate a loss event rate by using the past eight histories
(11) loss event rate report
(12) bandwidth estimation/transmission rate control
(13) within RTT FIG. 2:
(1) transmitting terminal 101
(2) transmitting application 102
(3) transmission rate controlling portion 103
(4) call transfer controlling portion 104
(5) first receiving terminal 201
(6) receiving application 202
(7) loss history managing portion 203
(8) loss rate reporting portion 204
(9) route-associated information reporting portion 205
(10) call transfer controlling portion 206
(11) second receiving terminal 301
(12) receiving application 302
(13) loss history managing portion 303
(14) loss rate reporting portion 304
(15) route-associated information reporting portion 305
(16) call transfer controlling portion 306
(17) router 401
(18) Internet 501
(19) route 502 on the Internet
(20) call control server 601
(21) local network 701

FIG. 3:
(1) first receiving terminal
(2) second receiving terminal
(3) transmitting terminal
(4) call control server
(5) loss history managing portion
(6) call transfer controlling portion
(7) route-associated information reporting portion
(8) switching request (to the second receiving terminal)
(9) same route confirming request
(10) same route acknowledgement
(11) loss history
(12) transmission rate transfer
(13) transmission rate controlling portion
(14) loss rate reporting portion
(15) transmission rate control
(16) start from the transmission rate of the first receiving terminal FIG. 4:
(1) first receiving terminal
(2) second receiving terminal
(3) transmitting terminal
(4) call control server
(5) loss history managing portion
(6) call transfer controlling portion
(7) route-associated information reporting portion
(8) transfer instruction (to the second receiving terminal)
(9) same route confirming request
(10) same route acknowledgement
(11) no loss history
(12) no transmission rate designation
(13) loss rate report receiving/bandwidth estimating/transmission rate controlling portion
(14) loss sensing/loss rate reporting portion
(15) transmission rate control
(16) slow start FIG. 5:
(1) transmitting terminal 101
(2) transmitting application 102
(3) transmission rate controlling portion 103
(4) call transfer controlling portion 104
(5) first receiving terminal 201

(6) receiving application 202
(7) loss history managing portion 203
(8) loss rate reporting portion 204
(9) call transfer controlling portion 206
(10) same route deciding portion 207
(11) second receiving terminal 301
(12) receiving application 302
(13) loss history managing portion 303
(14) loss rate reporting portion 304
(15) route-associated information reporting portion 305
(16) call transfer controlling portion 306
(17) router 401
(18) Internet 501
(19) route 502 on the Internet
(20) same network 701
  FIG. 6:
(1) first receiving terminal
(2) second receiving terminal
(3) transmitting terminal
(4) loss history managing portion
(5) call transfer controlling portion
(6) same route deciding portion
(7) route-associated information reporting portion
(8) REFER (transmitting terminal)
(9) history handover executed
(10) same route confirming request
(11) same route acknowledgement
(12) loss history information
(13) history handover completed
(14) transmission rate controlling portion
(15) loss rate reporting portion
(16) transmission rate control
(17) start from the transmission rate of the first receiving terminal
  FIG. 7:
(1) first receiving terminal
(2) second receiving terminal
(3) transmitting terminal
(4) loss history managing portion
(5) call transfer controlling portion
(6) same route deciding portion
(7) route-associated information reporting portion
(8) REFER (transmitting terminal)
(9) history handover executed
(10) same route confirming request
(11) same route acknowledgement
(12) no history handover
(13) transmission rate controlling portion
(14) loss rate reporting portion
(15) transmission rate control
(16) slow start
  FIG. 8:
(1) first receiving terminal
(2) second receiving terminal
(3) transmitting terminal
(4) loss history managing portion
(5) call transfer controlling portion
(6) route-associated information reporting portion
(7) same route deciding portion
(8) INVITE (transmitting terminal)
(9) OK same route confirming request
(10) ACK same route acknowledgement loss history information
(11) loss history information
(12) JOIN issue
(13) transmission rate controlling portion
(14) transmission rate reporting portion
(15) transmission rate control
(16) start from the transmission rate of the first receiving terminal
  FIG. 9:
(1) transmitting terminal 101
(2) transmitting application 102
(3) transmission rate controlling portion 103
(4) call transfer controlling portion 104
(5) first receiving terminal 201
(6) receiving application 202
(7) loss history managing portion 203
(8) loss rate reporting portion 204
(9) call transfer controlling portion 206
(10) same route deciding portion 207
(11) second receiving terminal 301
(12) receiving application 302
(13) loss history managing portion 303
(14) loss rate reporting portion 304
(15) route-associated information reporting portion 305
(16) call transfer controlling portion 306
(17) router 401
(18) Internet 501
(19) route 502 on the Internet
(20) first network 701
(21) second network 702

The invention claimed is:

1. A communication method of switching a receiving terminal of streaming content to which a rate control using Transmission Control Protocol (TCP) Friendly Rate Control (TFRC) is applied from a first receiving terminal to a second receiving terminal, comprising:
a deciding step of deciding whether or not a route on a network between a transmitting terminal of the streaming content and the first receiving terminal is identical to a route on the network between the transmitting terminal and the second receiving terminal;
a transferring step of transferring history information of a packet loss that the first receiving terminal is managing to the second receiving terminal if it is decided that both routes are identical, wherein a transmission rate of said streaming content transmitted from said transmitting terminal to said second receiving terminal is determined using said history information to take over said transmission rate from said first receiving terminal to said second receiving terminal; and
wherein, if it is decided that both routes are not identical, said transmission rate to said second receiving terminal is determined without using said history information.

2. A communication method according to claim 1, further comprising:
an informing step of informing the transmitting terminal and the second receiving terminal that the history information of the packet loss has been transferred from the first receiving terminal to the second receiving terminal when it is decided that both routes are identical, and informing the transmitting terminal and the second receiving terminal that the history information of the packet loss has not been transferred from the first receiving terminal to the second receiving terminal and only a switching of the receiving terminal has been conducted when it is decided that both routes are not identical.

3. A communication method according to claim 1, wherein the deciding step measures the route by means of traceroute.

4. A communication method according to claim 1, wherein the deciding step decides whether or not the first receiving terminal and the second receiving terminal are connected to a same network, and decides whether or not only one router is connected to the same network from the transmitting terminal.

5. A communication method of adding a second receiving terminal in addition to a first receiving terminal, as a receiving terminal of a streaming content that is distributed in a multicast while undergoing a rate control using Transmission Control Protocol (TCP) Friendly Rate Control (TFRC), comprising:
- a deciding step of deciding whether or not a route on a network between a transmitting terminal of the streaming content and the first receiving terminal is identical to a route on the network between the transmitting terminal and the second receiving terminal; and
- a transferring step of transferring history information of a packet loss that the first receiving terminal is managing to the second receiving terminal if it is decided that both routes are identical, wherein a transmission rate of said streaming content transmitted from said transmitting terminal to said second receiving terminal is determined using said history information to take over said transmission rate from said first receiving terminal to said second receiving terminal; and
- wherein, if it is decided that both routes are not identical, said transmission rate to said second receiving terminal is determined without using said history information.

6. A receiving terminal of a streaming content to which a rate control using Transmission Control Protocol (TCP) Friendly Rate Control (TFRC) is applied, comprising:
- a deciding function of deciding whether or not a route on a network between a transmitting terminal of the streaming content and own terminal is identical to a route on the network between the transmitting terminal and another receiving terminal; and
- a transferring function of transferring history information of a packet loss that own terminal is managing to the another receiving terminal when it is decided that both routes are identical, wherein a transmission rate of said streaming content transmitted from said transmitting terminal to said second receiving terminal is determined using said history information to take over said transmission rate from said first receiving terminal to said second receiving terminal; and
- wherein, if it is decided that both routes are not identical, said transmission rate to said second receiving terminal is determined without using said history information.

7. A receiving terminal of a streaming content that is distributed in a multicast while undergoing a rate control using Transmission Control Protocol (TCP) Friendly Rate Control (TFRC), comprising:
- a deciding function of deciding whether or not a route on a network between a transmitting terminal of the streaming content and own terminal is identical to a route on the network between the transmitting terminal and a receiving terminal that is added newly as a terminal that receives the streaming content; and
- a transferring function of transferring history information of a packet loss that own terminal is managing to the receiving terminal that is added newly when it is decided that both routes are identical, wherein a transmission rate of said streaming content transmitted from said transmitting terminal to said second receiving terminal is determined using said history information to take over said transmission rate from said first receiving terminal to said second receiving terminal; and
- wherein, if it is decided that both routes are not identical, said transmission rate to said second receiving terminal is determined without using said history information.

8. A communication method of switching a receiving terminal of streaming content to which a rate control using Transmission Control Protocol (TCP) Friendly Rate Control (TFRC) is applied from a first receiving terminal to a second receiving terminal, comprising:
- a deciding step of deciding whether or not a route on a network between a transmitting terminal of the streaming content and the first receiving terminal is identical to a route on the network between the transmitting terminal and the second receiving terminal;
- a transferring step of transferring history information of a packet loss that the first receiving terminal is managing to the second receiving terminal if it is decided that both routes are identical, wherein said history information is not transferred to the second receiving terminal if it is decided that both routes are not identical; and
- informing the transmitting terminal and the second receiving terminal that the history information of the packet loss has been transferred from the first receiving terminal to the second receiving terminal when it is decided that both routes are identical, or informing the transmitting terminal and the second receiving terminal that the history information of the packet loss has not been transferred from the first receiving terminal to the second receiving terminal and only a switching of the receiving terminal has been conducted when it is decided that both routes are not identical.

* * * * *